United States Patent [19]

Jonckheere

[11] Patent Number: 5,624,315

[45] Date of Patent: Apr. 29, 1997

[54] CLEANING MEANS FOR AN AGRICULTURAL HARVESTING MACHINE

[75] Inventor: Marc R. M. Jonckheere, Snellegem, Belgium

[73] Assignee: New Holland North America, Inc., New Holland, Pa.

[21] Appl. No.: 528,489

[22] Filed: Sep. 14, 1995

[30] Foreign Application Priority Data

Sep. 17, 1994 [GB] United Kingdom ............... 9418803

[51] Int. Cl.$^6$ ............................................. A01F 12/44
[52] U.S. Cl. ..................................... 460/99; 460/100
[58] Field of Search ............................ 460/100, 97, 98, 460/99, 101, 117, 119, 903

[56] References Cited

U.S. PATENT DOCUMENTS 3,833,006  9/1974  Temple ................... 460/100 X
4,307,732  12/1981 De Busscher et al. ....... 460/100 X

FOREIGN PATENT DOCUMENTS 1441981  7/1965  France .
2063034  6/1981  United Kingdom .

*Primary Examiner*—Terry Lee Melius
*Attorney, Agent, or Firm*—Frank A. Seemar; Larry W. Miller; John W. Stader

[57] ABSTRACT

A combine harvester (1) is provided with a grain cleaning mechanism (12), comprising a fan (33) installed in a generally volute-shaped fan housing (72), having primary air inlets (73) in its side walls and a secondary air inlet (74) in its top wall. The housing (72) further has a main outlet duct (80) directed to a chaffer sieve (31) and a lower grain sieve (32) and an additional outlet duct (81) directed to a pre-cleaning sieve (29) and an associated grain pan (30). The secondary air inlet (74) is covered with a plurality of juxtaposed plates (75), comprising sets of louvres (76) which are opened rearwardly. Grain kernels which unwantedly fall off the leading edges of the sieves (29, 31, 32) or the grain pan (30) and into the outlet duct (80, 81), may be engaged and thrown upwardly by the blades (95) of the fan (33), but will be returned into the fan housing (72) by the louvres (76), which nevertheless do not obstruct an efficient air intake by the fan (33).

12 Claims, 4 Drawing Sheets

CLEANING MEANS FOR AN AGRICULTURAL HARVESTING MACHINE

FIELD OF THE INVENTION

The present invention relates generally to agricultural harvesting machines, such as combine harvesters, and more specifically to the cleaning means, which is used for separating grain kernels from discardable material, such as coils, chaff and straw particles, under action of a fan which is mounted in an improved fan housing.

BACKGROUND OF THE INVENTION

Current harvesting machines have been developed for meeting the increasing needs of capacity and output under a wide range of field and crop conditions. In modern high capacity combine harvesters, one of the critical factors is the capacity of the cleaning means, comprising grain pans and sieves for receiving and cleaning the crop material from a threshing and separating mechanism. Besides grain kernels, this threshed crop material comprises discardable material, such as chaff and straw particles, which is blown out of the combine harvester by a ventilator or fan. In order to obtain an effective cleaning action, the fan has to generate a forceful and even air flow over and through the complete width of the sieves.

To that end, a conventional centrifugal fan structure, which comprises a fan, mounted in a generally volute-shaped housing with central air inlets in the side walls and a main air outlet duct directed towards the sieves, has been provided with an secondary air inlet in the top wall of the housing. Such configuration has been disclosed in GB-A-2,063,034. In order to keep impurities, such as crop stems, out of the fan housing, the secondary air inlet is provided with a perforated shield. For an effective air flow, deflector plates can be mounted in the air duct between the fan and the sieves, but no other obstructions may be placed therein. The air flow is directed via a main outlet duct towards an upper chaffer sieve and a lower cleaning sieve and via an additional outlet duct towards a pre-cleaning sieve and an associated grain pan. Said sieves and grain pan extend rearwardly and slightly upwardly to the rear of the harvester.

It has been experienced that under some circumstances grain kernels can move towards the forward end of the sieves and the associated grain pan and fall into one of the outlet ducts. This happens when their front portion is fully loaded with crop material and the combine harvester is suddenly halted and/or reversed. The crop material may also slide into the outlet ducts during downhill travel of the combine harvester. The air flow from the fan may blow back the lighter portion thereof towards the sieves, but this effect quickly diminishes when the sieves are fully loaded and the air flow is choked consequently. Even during normal operation of the harvester, crop particles may roll to and over the forward edge of the sieves: this occurs when the front portion of the sieves or the associated grain pan is polluted with a layer of sticky crop material. The even surface thereof gets no grip on the newly arriving crop particles, which migrate downwardly and forwardly until they fall into one of the outlet ducts.

The heavier portion of the crop material, including the grain kernels can penetrate further into the outlet ducts, until it is engaged by the blades of the rotating fan. Most of the grain kernels are projected one or several times against the walls of the fan housing and are finally launched into the main outlet trough and the clean grain auger duct below the lower cleaning sieve, from where they are conveyed to the grain tank. A considerable amount of kernels, however, is thrown upwardly and through the holes in the perforated plate of the secondary air inlet. They are scattered around the fan housing and fall on the field or accumulate on top of near harvester parts, such as the traction gearbox and the traction beam.

These grain losses are easily spotted and, although their cause may be incidental, e.g. a sudden halt of the machine, the losses should be avoided to the maximum extent. When they result from harvesting operations during prolonged downhill travel, one could consider to reduce the travelling speed of the harvesting machine in order to diminish the load on the sieves and hence the tendency of the crop material to slide to the leading edges of the sieves and the grain pan, but the consequent capacity losses largely exceed the value of the grain lost through the secondary air inlet.

The grain losses could also be reduced by reducing the diameter of apertures in the perforated plate, but this will have a choking effect on the air flow through this inlet and hence affects the efficiency of the fan structure.

SUMMARY OF THE INVENTION

It therefore is the object of the present invention to provide an economical and effective solution for these grain losses without affecting the air flow through the air inlets. This is accomplished by providing the fan housing with a structure which returns the crop material, which was engaged by the rotor blades, into the housing and still permits the intake of cleaning air therethrough.

According to the present invention an agricultural harvesting machine is provided, comprising a threshing and separating mechanism for threshing and separating crop material, and a cleaning device for cleaning the threshed and separated crop material, which cleaning device comprises fan means having a generally volute-shaped fan housing with a primary air inlet in at least one side wall, a secondary air inlet in its circumference wall, and a generally rearwardly directed air outlet, and a fan rotor, installed for rotation within the housing and operable to draw in air through the primary air inlet and the secondary air inlet and to propel it through the air outlet. The cleaning device further comprises sieve means and/or grain pan means, installed for oscillation near the air outlet and operable to move the threshed and separated crop material theretrough and/or therealong. More particularly, the invention contemplates a harvesting machine in which the secondary air inlet is provided with a set of louvres operable to return crop particles, falling from the sieve means and/or grain pan means and being engaged by the rotor, into the fan housing.

The foregoing and other objects, features and advantages of the invention will appear more fully hereinafter from a consideration of the detailed description which follows, in conjunction with the accompanying sheets of drawings wherein one principal embodiment of the invention is illustrated by way of example. It is to be expressly understood, however, that the drawings are for illustrative purposes and are not to be construed as defining the limits of the invention.

DESCRIPTION OF THE PREFERRED EMBODIMENT

Figure 1:
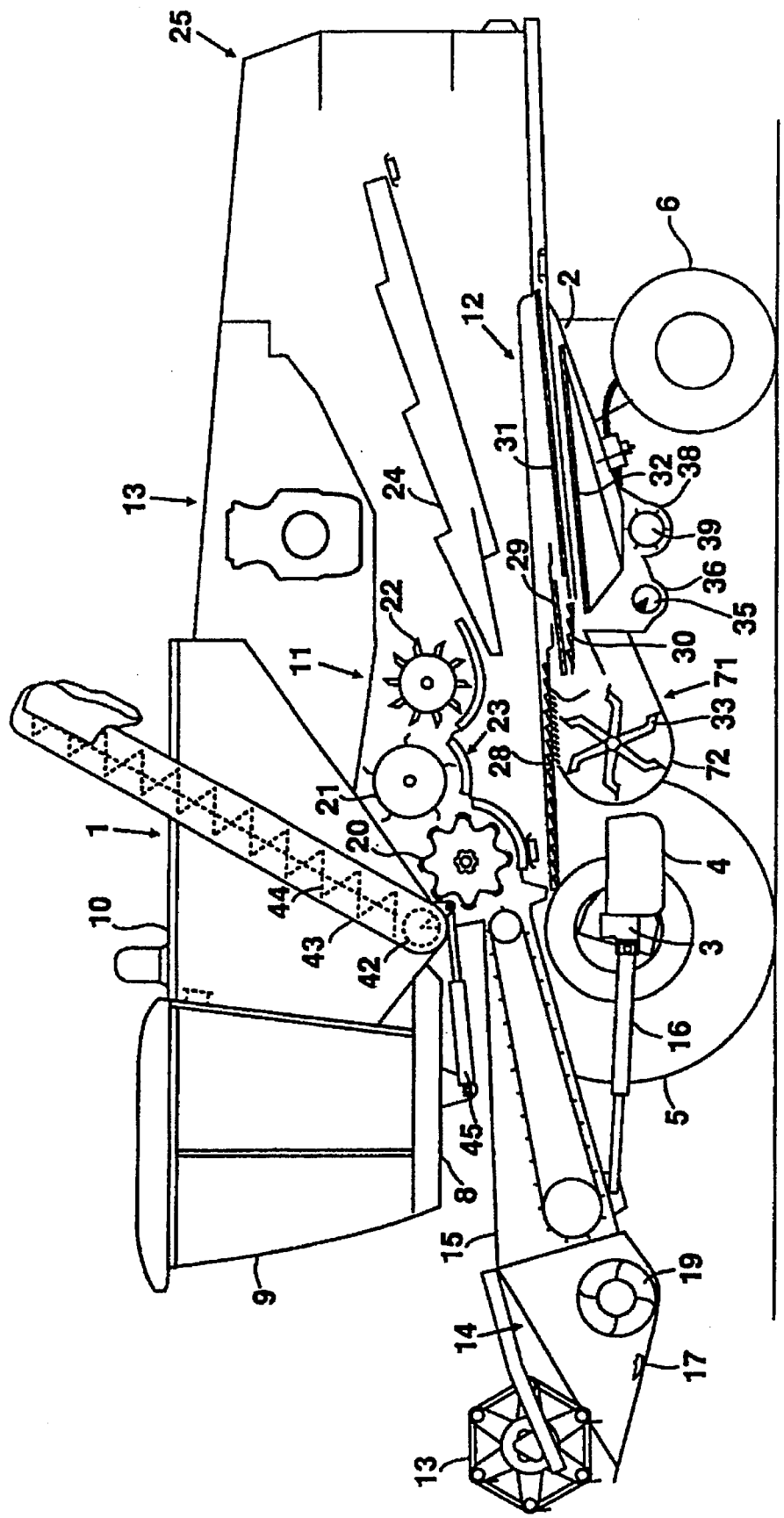
FIG. 1 is a diagrammatic side elevation of the combine harvester, comprising a threshing and separating mechanism and a cleaning mechanism.

As illustrated in FIG. 1, a combine harvester, generally indicated at 1, comprises a main chassis or frame 2, supported on a fixed front axle 3 and a oscillating rear axle (not shown). The front axle 3 carries a traction gearbox 4, which is drivingly connected to a pair of drive wheels 5, supporting the front portion of the frame 2. The rear axle is supported by a pair of steerable wheels 6. Mounted onto the main frame 2 are an operator's platform 8, with an operator's cab 9, a grain tank 10, a threshing and separating mechanism 11, a grain cleaning mechanism 12, and a power plant or engine 13. A conventional header 14 and straw elevator 15 extend forwardly of the main frame 2 and are pivotally secured thereto for generally vertical movement, which is controlled by extensible hydraulic cylinders 16.

As the combine harvester 1 is propelled forwardly over a field with standing crop, the latter is severed from the stubble by a sickle bar 17 at the front of the header 14 and guided by a reel 18 and an auger 19 to the straw elevator 15, which supplies the cut crop to the threshing and separating mechanism 11. The crop received therein is threshed and separated, that is to say, the crop is rubbed and beaten, whereby the grain, seed or the like, is loosened and separated from the straw, coils or other discardable part of the crop.

The combine harvester 1, illustrated in FIGS. 1, comprises a conventional threshing and separation mechanism 11 including a threshing cylinder 20, a straw beater 21 and a separator rotor 22, cooperating with a set of concaves 23. Conventional straw walkers 24 are operable, in use, to discharge a mat of remaining crop material (i.e. mainly straw as most grain is separated therefrom) through a straw hood 25.

Grain which has been separated by the threshing and separating mechanism 11 falls onto a first grain pan 28 of the cleaning mechanism 12, which further also comprises a pre-cleaning sieve 29, positioned above a second grain pan 30, an upper chaffer sieve 31 and a lower grain sieve 32, disposed one above the other behind and below the pre-cleaning sieve 29, and a cleaning fan 33. The actual operation of the cleaning mechanism 12 will be discussed further, after a more detailed description of its components.

Clean grain falls to a clean grain auger 35 in a clean grain auger trough 36 and is subsequently transferred by the auger 35 and an elevator mechanism (not shown) to the grain tank 10. Incompletely threshed ears, the so-called "tailings", fall to a tailings auger 37 (only shown in FIG. 2) in a tailings auger trough 38. The tailings are transported sideways by this auger 37 to a separate rethresher 39 and returned to the first grain pan 28 for repeated cleaning action.

A grain tank auger 42 at the bottom of the grain tank 7 is used to urge the clean grain sideways to an unloading tube 43, wherein it is elevated by an unloading auger 44 for discharge from the harvester 1.

Figure 2:
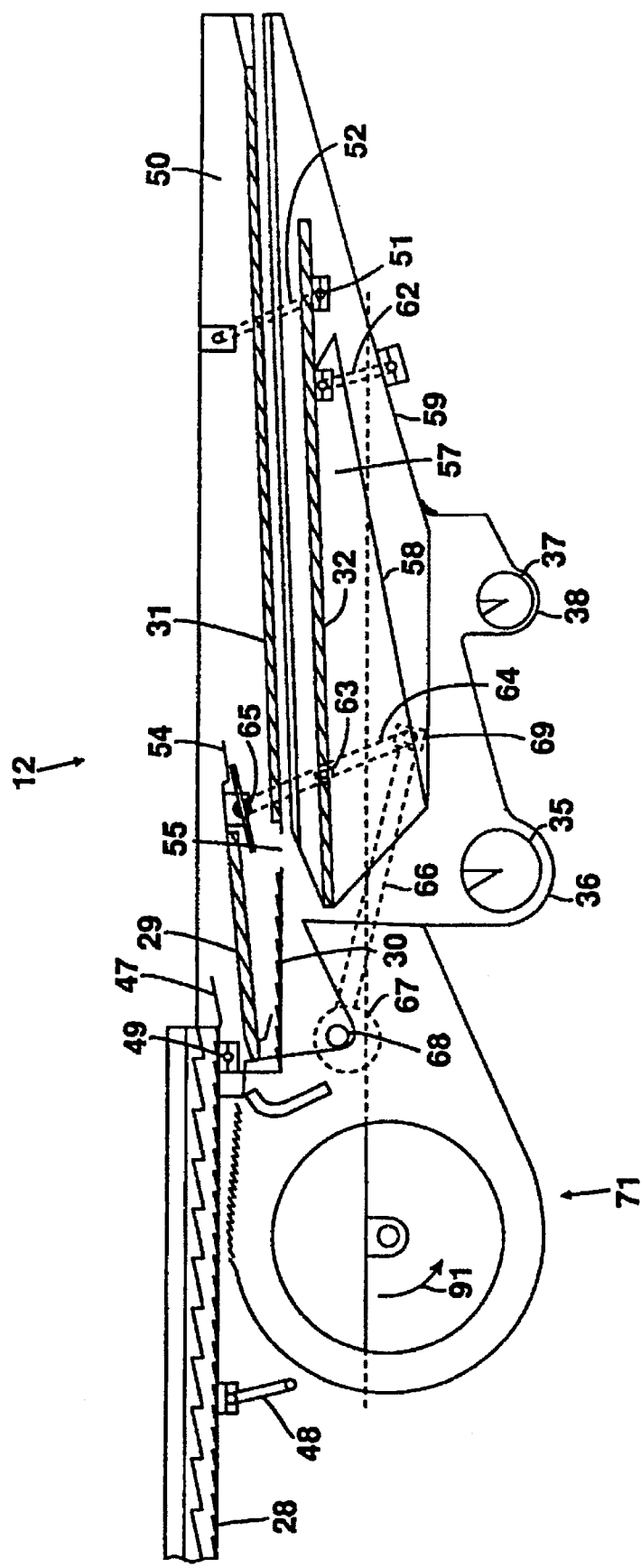
FIG. 2 shows to a larger scale and in side view the cleaning mechanism of the combine harvester of FIG. 1.

As shown in FIG. 2, the first grain pan 28 has a generally horizontal, stepped surface, which extends from below the forward edge of the threshing concaves 23 to the forward edge of the straw walkers 24, and is thus disposed to receive threshed and separated material from the concaves 23 and the forward portion of the straw walkers 24. A conventional comb assembly 47 is secured to the discharge end of the first grain pan 28.

The first grain pan 28 is suspended adjacent its forward end on a pair of cranks 48 and at its rear end via pivots 49 to an upper cleaning shoe 50.

The upper cleaning shoe 50 extends from the discharge end of the first grain pan 28 to the rearwardmost end of the cleaning mechanism 12. Adjacent its rearward end, the upper cleaning shoe 50 is movably supported via rocking arms 52 at pivots 51 on the main frame 2. The pre-cleaning sieve 29, the second grain pan 30 and the chaffer sieve 31 are all carried by the upper cleaning shoe 50.

The pre-cleaning sieve 29 extends rearwardly and slightly upwardly from a location below and forwardly of the discharge end of the first grain pan 28. At its rear end the pre-cleaning sieve 29 carries a comb assembly 54 similar to the assembly 47.

The second grain pan 30, which is located below the pre-cleaning sieve 29, terminates short of the rear end of the latter.

The forward end of the chaffer sieve 31 is located below and forwardly of the discharge end of the pre-cleaning sieve 29. Therefrom, the chaffer sieve 31 extends rearwardly and slightly upwardly to the rear end of the upper cleaning shoe 50. Between the second grain pan 30 and the chaffer sieve 31 a discharge opening 55 is provided.

A lower cleaning shoe 57 is arranged below the upper cleaning shoe 50 and comprises a clean grain conveyor floor 58 and a tailings conveyor floor 59 terminating respectively above the clean grain auger 35 and the tailings auger 37. The lower cleaning shoe 57 is arranged to support the lower grain sieve 32 so that it has its forward edge forwardly of and below the discharge end of the second grain pan 30 and its rear edge forwardly of and below the rear end of the upper chaffer sieve 31.

The lower cleaning shoe 57 is movably supported on the frame 2 at pivots 61 (frame not shown) via rock arms 62 and at pivots 63 (frame again not shown) via rock arms 64. The rock arms 64 on both sides of the cleaning mechanism 12 are extended above the level of the pivots 63 and are pivotally coupled at 65 to the upper cleaning shoe 50.

The drive means for the cleaning shoes 50, 57 comprise crank shafts 66 extending between eccentrics 67 on an intermediate shaft 68 and pivots 69 on the lower cleaning shoe 57.

In a conventional manner, the sieves 29, 31, 32 comprise a plurality of angularly adjustable and overlapping louvres, which together form a mesh for grain to pass through.

Figure 3:
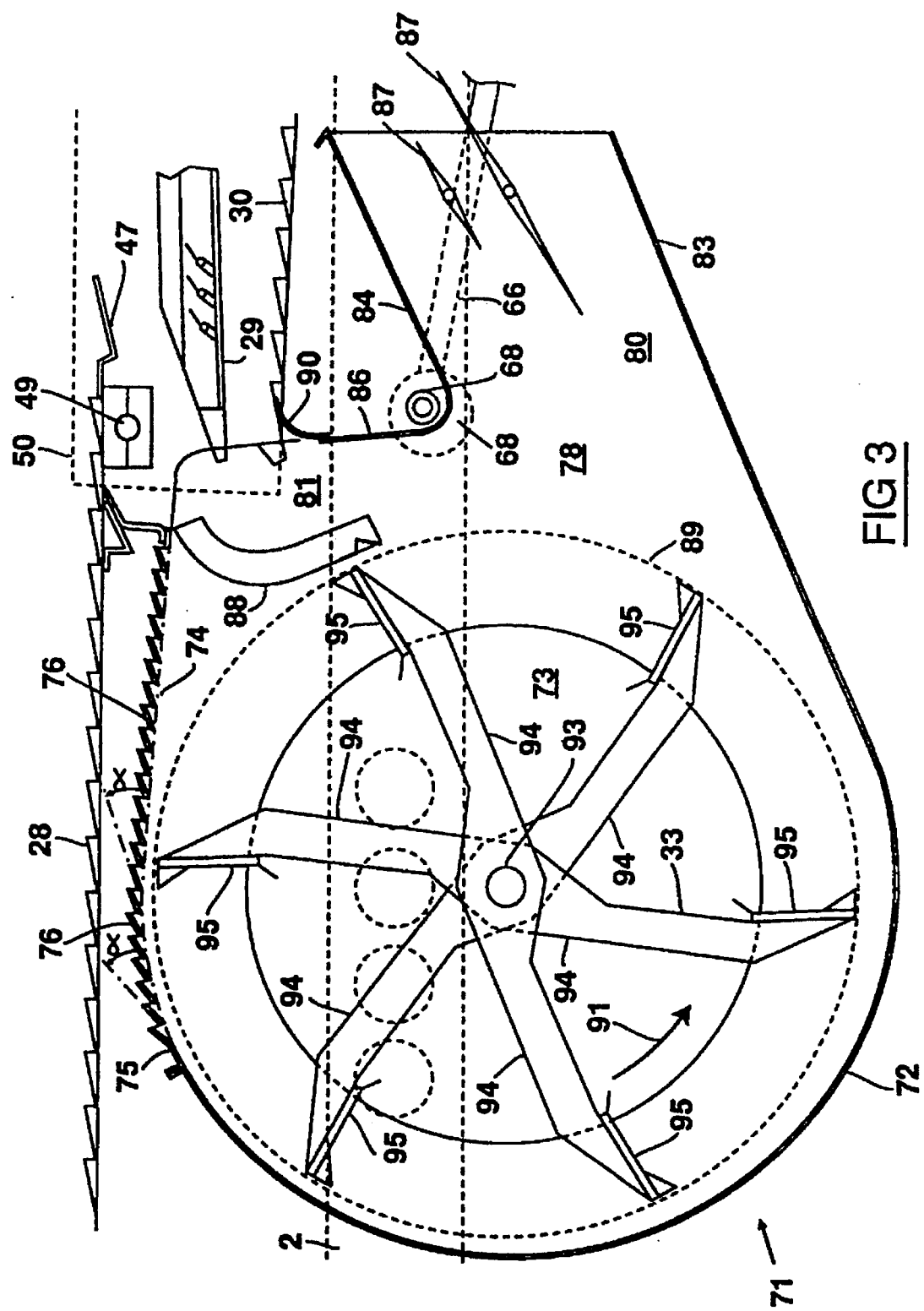
FIG. 3 is an enlarged view of the fan and the fan housing of the cleaning mechanism of FIG. 2.

Fan means, generally indicated at 71 (FIG. 3) are disposed generally behind the traction gearbox 4 and below the first grain pan 28. They comprise the fan 33 and a generally volute-shaped fan housing 72, having a pair of opposed primary air inlets 73 in the side walls. A secondary air inlet 74 is provided in an upper portion of the housing 72 over the full width thereof. This secondary air inlet 74 is covered by a plurality of similar juxtaposed plates 75, comprising each a set or rearwardly opened louvres 76.

Over its full width, the fan housing 72 has an outlet 78, which communicates with a combined outlet structure comprising a main outlet duct 80 and an additional outlet duct 81.

The main outlet duct 80 extends upwardly and rearwardly and faces the underside of the lower sieve 32, the underside of the chaffer sieve 31 and the discharge opening 55 between the second grain pan 30 and the lower sieve 32. The main outlet duct 80 comprises a bottom wall 83 and a top wall 84, which is oriented generally parallel to the bottom wall 83. The top wall 84 has a rounded forward end, spaced from the circumscribing circle 89 of the fan 33 and extending into a substantially vertical wall 86 which forms part of the additional outlet duct 81. A pair of deflector baffles 87 is angularly adjustably mounted in the main outlet duct 80.

The additional outlet duct 81 is confined by the wall section 86 already mentioned and a further wall section 88, which extends generally parallel to a tangent to the circumscribing circle 89 of the fan 33 and has its lower edge closely adjacent that circle 89 and at a distance slightly above the level of the lower end of the wall section 86. The upper portion of the wall section 88 is curved through almost 90° and faces rearwardly and upwardly, being located above the level of the top edge of the other wall section 86, which comprises a sealing strip 90, sealingly engaging the underside of the second grain pan 30. The additional outlet duct 81 is disposed so that its outlet faces the area between the discharge end of the first grain pan 28 and the leading edge of the second grain pan 30. The leading edge of the pre-cleaning sieve 29 is positioned at about the middle of this area.

The secondary air inlet 74 extends from the upper edge of the wall section 88 in the direction of rotation 91 of the fan 33, whereby this additional inlet is located forwardly of the outlet 78 with respect to said direction of rotation 91.

The fan 33 comprises a central shaft 93 with a number of supporting arms 94 extending generally radially outwardly therefrom and carrying at their outer ends fan blades 95 having inner and outer sections, which are curved forwardly relative to the direction of rotation 91. These fan blades 95 of generally concave shape together with the primary inlets 73 and the secondary air inlet 74 make the fan means 71 act as a combination of a so-called "centrifugal fan" and a so-called "cross-flow fan".

The inlet plates 75 extend between the forward end of the secondary air inlet 74 and the top of the forward wall section 88 of the additional outlet duct 81. The full width of the fan housing 72 is covered with the juxtaposed inlet plates 75, which have a convex front portion, in alignment with the cylindrical portion of the housing 72 and positioned above and forwardly of the fan shaft 93, and a flat rear portion which lies in a substantially horizontal plane. The rearwardly opened louvres 76 in both plate portions have a constant opening angles $\alpha$, which can be defined as the angles between the louvres 76 and the straight line connecting the lower ends of the louvres 76 in the flat portion of the plates 75, or as the angles between the louvres 76 and the tangents to the circle arc connecting the lower ends of the louvres 76 in the convex portion of the plates 75. These angles $\alpha$ are substantially equal to 30°. The distance between the top edges of the louvres 76 and the lower edges of the following louvres 76 is substantially equal to 12 mm, i.e. significantly larger than the thickness of the largest crop kernels (corn, peas or beans).

Figure 4:
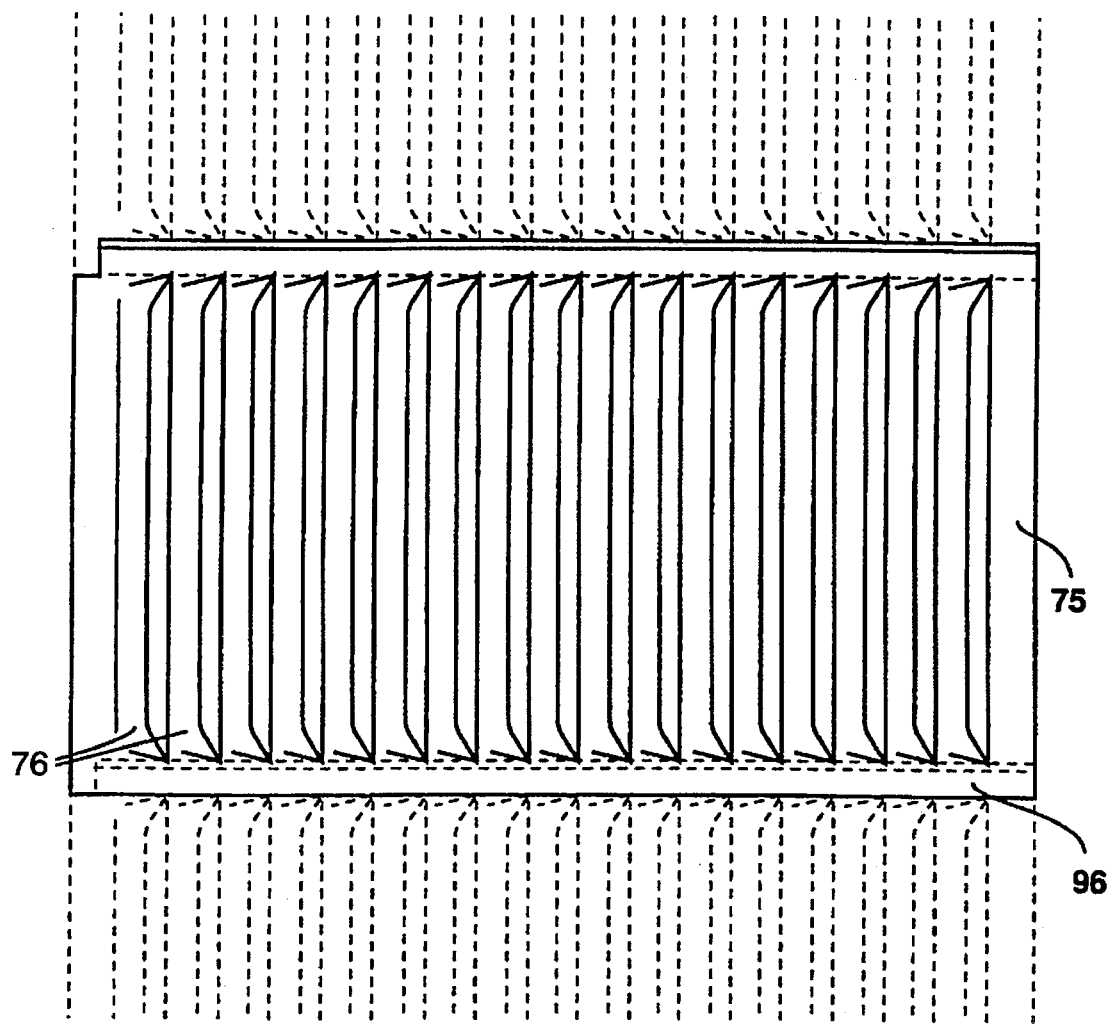
FIG. 4 is a top view of one of the louvre sets in the fan housing of FIG. 3.

The inlet plates 75 with the louvres 76 are made out of sheet metal by means of a stamping operation, which leaves a rim of flat material around the louvres 76 (FIG. 4). The plates 75 have a small overlay 96 for spotwelding to each other and to the side wall of the fan housing 72. Their number is adapted to the overall width of the fan housing 72. Different housing widths for application to different combine models can be covered with one type of plate 75 in different numbers, thus permitting a valuable standardization of the components.

When the cleaning mechanism 12 is in operation, the fan 33 is rotated in the direction 91 and the cleaning shoes 50, 57, with the elements attached thereto, are oscillated. Cleaning air blasts are directed through the outlet ducts 80, 81 of the fan housing 72.

Material separated through the threshing concaves 23 falls onto the first grain pan 28, building a crop material layer thereon, which, especially on large capacity combine harvesters, may be relatively thick. By virtue of the oscillatory movement of the grain pan 28, the material thereon is gradually moved towards its discharge end, whilst allowing the heavier grain kernels to "sink" to the lower portions of the layer and thus allowing the lighter chaff, straw, dust and other lightweight impurities to rise to the top.

As the layer of crop material drops off the discharge end of the grain pan 28 towards the pre-cleaning sieve 29, it is subjected to a strong air blast from the additional fan outlet duct 81. A major portion of the lightweight impurities immediately becomes airborne and is moved in the direction of the discharge end of the cleaning mechanism 12.

A layer of crop material of already reduced thickness thus falls on the pre-cleaning sieve 29, the mesh of which is adapted to the kind of crop being handled. A cleaning air blast is directed from below and through the pre-cleaning sieve 29 as well as through the area between that sieve 29 and the second grain pan 30 therebelow. As the layer is moved across the sieve 29 towards its discharge end, grain which has been cleaned to a great extent, falls through the pre-cleaning sieve 29 and across said air blast onto the second grain pan 30 and is conveyed therefrom directly to the lower grain sieve 32. As the grain falls from the second grain pan 30 to the lower sieve 32, it is again subjected to a cleaning air blast which this time issues from the main fan outlet duct 80.

The remainder of the layer of crop material on the pre-cleaning sieve 29 falls onto the chaffer sieve 31. Again a cleaning air blast, also issuing from the additional outlet duct 81 is directed onto this layer during its fall. A further percentage of impurities thus becomes airborne and, together with the impurities coming from the stage above, is carried out of the machine.

A cleaning air blast from the main outlet duct 80 is directed through the areas below the chaffer sieve 31 and the lower grain sieve 32 as well as through those sieves 31, 32 from below, so that the remaining impurities become airborne and are blown out of the machine whilst cleaned grain falls through the sieves 31, 32 and through the cleaning air blasts onto the clean grain conveyor floor 58, which conveys the cleaned grain to the clean grain auger 35 for transport to the grain tank 10.

The fan means 71 operate partially as a centrifugal fan and partially as a cross flow fan. The fan blades 95 are operable to draw air in not only through the opposed primary inlets 73 as in centrifugal fans, but also through the transverse secondary inlet 74 as in cross flow fans. As a result, the cleaning air blast is distributed evenly transversely of the fan means 71, even when a relatively wide cleaning fan 33 is employed.

The major portion of the cleaning air is expelled from the fan housing 72 through the main outlet duct 80, whilst the remainder is directed through the additional outlet duct 81. The direction of the blast of cleaning air issuing from the main outlet duct 80 and directed to the chaffer sieve 31 and the lower sieve 32, is adjustable by the angularly adjustable baffles 87.

In order to avoid obstruction of the wind blast at the leading edges of the sieves 29, 31, 32 and the second grain pan 30, no means are provided for retaining crop material which has piled up in the forward portions of these sieves 29, 31, 32 and grain pan 30. Under normal circumstances, the oscillatory movement of the cleaning shoes 50, 57 suffices to convey the material rearwardly and away from these leading edges. In some cases, however, the layer of crop material may slide forwardly and fall into one of the outlet ducts 80, 81.

This occurs when the forward portion of the pre-cleaning sieve 29, the lower grain sieve 32 or the second grain pan 30 is fully loaded and the combine harvester 1 is halted and/or reversed abruptly. The inertia of the crop material makes it roll to and over the leading edges of the sieves 29, 32 or the grain pan 30, where it is engaged by the air blast through the outlet ducts 80, 81. The lighter portion of the falling crop material, such as chaff, dust and straw particles, may still be lifted up and blown back towards the rear of the harvester 1 by the air blasts trough the outlet ducts 80, 81, but the grain kernels can penetrate much further in the outlet ducts 80, 81 and eventually reach the bottom wall 83 of the fan housing 72. These kernels roll down the bottom wall 83 and accumulate at the lowest point below the fan shaft 93, where they build a layer between the side walls of the housing 72.

As there is only a small spacing between the bottom of the housing 72 and the circumscribing circle 89 of the fan blades 95, the kernels at the top of this layer are engaged by the tips of said fan blades 95, which project most of these kernels rearwardly through the main outlet duct 80 and into the lower cleaning shoe 57, where this portion of the clean grain is recovered either directly or indirectly on the grain conveyor floor 58 and transported therefrom to the clean grain auger trough 36.

Another portion of the clean grain, however, is lifted up by the fan blades 95 and launched against the walls of the fan housing 72. Most of the kernels which are thrown upwardly, are returned by the louvres 76 in the secondary air inlet 74, before they can reach the underside of the first grain pan 28 and be scattered around the fan means 71. Some kernels may be projected rearwardly and, if they reach the plate 75 under the angle α, inbetween the louvres 76. As these kernels are returned by the steps on the underside of the first grain pan 28, they fall back onto the louvres 76 and are guided by the slanted louvres 76 and the incoming air into the fan housing 72. The dimensions of the gaps at the entrance of the consecutive louvres 76 prevent that the latter are plugged with kernels or other crop material. No kernel projected by the fan blades 95 can pass the upper wall 75 along a forwardly directed straight or ballistic curve and end up in front of the housing 72, which was the case when a perforated plate was installed over the inlet 74.

Inside the housing 72, the returned grain is caught once more by the fan blades 95 and delivered directly or after repeated projections against the walls of the housing 72 to the lower cleaning shoe 57 and the clean grain auger 35 for further transport to the grain tank 10. Thus is secured that clean grain, which has fallen into the fan housing 72, remains within the machine and is not lost on the field.

Crop material may also slide forwardly and fall off the sieves 29, 32 and the second grain pan 30, when their forward portions are plugged and covered with a layer of kernels and sticky debris. The even surface of this layer has no grip on the newly arriving crop material, which is also not subjected to an air flow through the plugged portion of the sieves 29, 32, so that the kernels can roll down to the leading edges of the slanted sieves 29, 32 or second grain pan 30 and into the outlet ducts 80, 81.

Also when the combine harvester 1 is travelling down a steep hill, crop material migrates to the forward portions of the sieves 29, 32 and the second grain pan 30. In the latter case, a portion of the grain kernels, which fall from the pre-cleaning sieve 29 and the second grain pan 30 into the additional outlet duct 81, passes along the substantially vertical wall section 88 and is engaged by the tips of the fan blades 95, before it can reach the bottom of the fan housing 72. These grain kernels are also projected upwardly against the louvres 76 of the secondary air inlet 74 and thereby returned into the housing 72. In the end they are delivered to the main outlet duct 80 and the clean grain auger trough 36 for further transport to the grain tank 10.

Another portion of the grain kernels falling off the pre-sieve 29 and the second grain pan 30 passes along the rear vertical wall 86 of the secondary air outlet and reaches the bottom of the housing 72, where it can accumulate together with the grain which has fallen off the lower grain sieve 32 and rolled down the main outlet duct 80. These grain kernels are cleared from the fan housing 72 in the same manner as the kernels which fell therein after an abrupt halt of the combine harvester 1. The chaff, dust and straw particles, which reach the housing 72 are blown out of the harvester 1, while the heavier grain kernels are recovered and conveyed towards the grain tank 10.

While the preferred structure in which the principles of the present invention have been incorporated is shown and described above, it is to be understood that the invention is not to be limited to the particular details, as shown and described above, but that, in fact, widely different means may be employed in the practice of the broader aspects of the invention.

Having thus described the invention, what is claimed is:

1. An agricultural harvesting machine (1), comprising
   a threshing and separating mechanism (11) for threshing and separating crop material, and
   a cleaning device (12) for cleaning the threshed and separated crop material,
   said cleaning device (12) including fan means (71),
   said fan means comprising a generally volute-shaped fan housing (72) having a primary air inlet (73) in at least one side wall, a secondary air inlet (74) in its circumference wall and a generally rearwardly directed air outlet (80, 81), and a fan rotor (33), installed for rotation within said housing (72) and operable to draw in air through said primary air inlet (73) and said secondary air inlet (74) and to propel it through said air outlet (80, 81),
   said cleaning device (12) further including sieve means (29, 32) and/or grain pan means (30), installed for oscillation near said air outlet (80, 81) and operable to move the threshed and separated crop material therethrough and/or therealong, the improvement comprising
   said secondary air inlet (74) having a set of louvres (76) operable to return crop particles, falling from said sieve means (29, 32) or falling from said grain pan means (30), and being engaged by said fan rotor (33), into said fan housing (72),
   said secondary air inlet (74) also having a substantially flat portion wherein the angle (α) between said louvres (76) and said flat portion falls in the range of 20 to 40 degrees.

2. An agricultural harvesting machine according to claim 1, wherein said fan rotor (33) circumscribes a circle (89) that is closely adjacent the inner surface of the bottom of the fan housing (72).

3. An agricultural harvesting machine according to claim 2, wherein said air outlet (81) has disposed therein a forward wall portion (88) which extends generally vertically and has its lower edge closely adjacent said circumscribed circle (89).

4. An agricultural harvesting machine according to claim 1 wherein said louvres (76) are opened in the direction of said sieve means (29, 32).

5. An agricultural harvesting machine according to claim 1 wherein said secondary air inlet also has a convex portion and the angle ($\alpha$) between said louvres and the tangent to said convex portion falls in the range of 20 to 40 degrees.

6. An agricultural harvesting machine according to claim 1 wherein said angle ($\alpha$) is substantially equal to 30 degrees.

7. An agricultural harvesting machine according to claim 1 wherein the transverse distance between two consecutive louvres (76) is larger than the thickness of the crop particles.

8. An agricultural harvesting machine according to claim 7, wherein said transverse distance is substantially equal to 12 mm.

9. An agricultural harvesting machine according to claim 1 wherein said secondary air inlet (74) is covered with a plurality of similar juxtaposed louvre sets (75).

10. An agricultural harvesting machine (1), comprising a threshing and separating mechanism (11) for threshing and separating crop material, said threshing and separating mechanism including a grain pan, and a cleaning device (12) for cleaning the threshed and separated crop material, said cleaning device (12) including fan means (71), said fan means comprising a generally volute-shaped fan housing (72) having a primary air inlet (73) in at least one side wall, a secondary air inlet (74) in its circumference wall and a generally rearwardly directed air outlet (80, 81), and a fan rotor (33), installed for rotation within said housing (72) and operable to draw in air through said primary air inlet (73) and said secondary air inlet (74) and to propel it through said air outlet (80, 81), said cleaning device (12) further including sieve means (29, 32) and/or grain pan means (30), installed for oscillation near said air outlet (80, 81) and operable to move the threshed and separated crop material therethrough and/or therealong, the improvement comprising said secondary air inlet (74) having a set of louvres (76) operable to return crop particles, falling from said sieve means (29, 32) or falling from said grain pan means (30), and being engaged by said fan rotor (33), into said fan housing (72), said louvres comprising a plurality of similar juxtaposed plates affixed along a flat portion of said secondary air inlet to provide openings in the direction of said sieve means.

11. An agricultural harvesting machine according to claim 10 wherein said flat portion is disposed generally parallel and between said grain pan and said rotor of said fan means.

12. An agricultural harvesting machine according to claim 10 wherein said secondary air inlet also has a convex portion adjacent said flat portion.

* * * * *